(12) United States Patent
Coleman

(10) Patent No.: US 7,454,475 B1
(45) Date of Patent: Nov. 18, 2008

(54) METHOD AND SYSTEM FOR USING MESSAGE CONTENT TO GROUP MESSAGES

(75) Inventor: Andrew Coleman, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,529

(22) Filed: Jan. 26, 2008

(51) Int. Cl.
*G06F 15/16* (2006.01)
*G06F 15/173* (2006.01)

(52) U.S. Cl. ............... 709/207; 709/206; 709/217; 709/238

(58) Field of Classification Search ......... 709/204–208, 709/217–219, 238–245
See application file for complete search history.

(56) References Cited

U.S. PATENT DOCUMENTS

| | | | |
|---|---|---|---|
| 5,191,326 A | 3/1993 | Montgomery | |
| 7,320,001 B1 * | 1/2008 | Chen | 707/100 |
| 2002/0116389 A1 * | 8/2002 | Chen et al. | 707/103 R |
| 2004/0128305 A1 | 7/2004 | Levin et al. | |
| 2004/0133672 A1 | 7/2004 | Bhattacharya et al. | |
| 2004/0264405 A1 | 12/2004 | MacGregor | |
| 2005/0080819 A1 * | 4/2005 | Russell | 707/104.1 |
| 2005/0193286 A1 * | 9/2005 | Thatte et al. | 714/48 |
| 2005/0289023 A1 * | 12/2005 | Hahn-Carlson et al. | 705/30 |
| 2006/0047595 A1 * | 3/2006 | Bertilsson | 705/37 |
| 2007/0192490 A1 | 8/2007 | Minhas | |
| 2007/0206633 A1 | 9/2007 | Melamed et al. | |

\* cited by examiner

*Primary Examiner*—Joseph E Avellino
(74) *Attorney, Agent, or Firm*—MaxvalueIP, LLC

(57) ABSTRACT

In a message grouping application, the broker/ESB architecture allows the messages mid-flow to pause and collecting them into groups according to a correlation string that is calculated from the content of the messages. Furthermore, minimum/maximum quantity and timeout constraints are applied to the group. Once a collection, as a group of related messages, is deemed complete, they are combined into one message and routed or transformed as directed in their combined content. This scheme allows message processing to be batched according to the combined business meaning of multiple inputs.

1 Claim, 2 Drawing Sheets

METHOD AND SYSTEM FOR USING
MESSAGE CONTENT TO GROUP MESSAGES

BACKGROUND OF THE INVENTION

Numerous organizations process incoming, outgoing, and internal messages to extract valuable information about the ongoing activities, for instance, to monitor the degree of satisfaction of the employees, the extent of business collaboration with the outside world, or to follow a specific transaction. In providers such as Yahoo! or Gmail, an extremely large number of messages are processed in appropriate filters everyday to eliminate spam and malware or to group them in several categories for ease of use. Alternatively, message monitoring helps identify network intruders by analyzing the incoming, outgoing, and internal messages of a given company.

The message-processing unit needs to act on a message and then move on to the next message. In most situations, such as in grouping email messages, this method proves adequate. There are instances, however, that the meaning of a message, and hence the group it should be assigned to, depends on the previous or next messages. In other words, the meaning of the message in those instances can only be apparent in its appropriate context. There are applications, which include complex event processing, but they let the original message pass unaffected. Presently, a method to gather related messages in a group, before they are processed as a collection, does not exist. The present invention is about categorizing messages in several collections to be processed in the context to which they belong.

SUMMARY OF THE INVENTION

One embodiment extends the broker/ESB architecture by allowing the messages mid-flow to pause and collecting them into groups according to a correlation string that is calculated from the content of the messages. Furthermore, minimum/maximum quantity and timeout constraints can be applied to the group. Once a grouping of messages is deemed complete, they are combined into one message and routed or transformed according to their combined content. This scheme allows message processing to be batched according to the combined business meaning of multiple inputs.

DETAILED DESCRIPTION OF THE PREFERRED EMBODIMENTS

Message processing in a distributed network includes both routing and delivery of messages as well as transforming such messages. These activities are typically performed by message brokers in a middleware implementation; for example, in an implementation of Enterprise Service (ESB) or Bus software architecture. Typically, the messages are dealt with one by one and independent of each other.

Message processing in a broker (or ESB) generally involves their routing and/or transformation. The content of the input message is generally used to determine the content or destination of the output. Traditionally, this is done one message at a time whereby the content of each message is considered in isolation. However, there are certain applications whereby the meaning of a message can be different depending on the content of previous or subsequent messages. In other words, a message might require the wider context of related messages before it can be processed.

Even in newer technologies such as Complex Event Processing (CEP), the flow of messages through the broker is unaffected, however, the information from the related messages are extracted for processing of complex events that determine their context from multiple related messages.

In one embodiment of this invention, the flow of related messages is paused mid flow at the broker, until a related group of them is formed. Then, a combined message is routed or transformed according to its content. The invention allows processing these messages from multiple inputs, and it teaches group formation criteria and management. The proposed method comprises the following.

Figure 1:
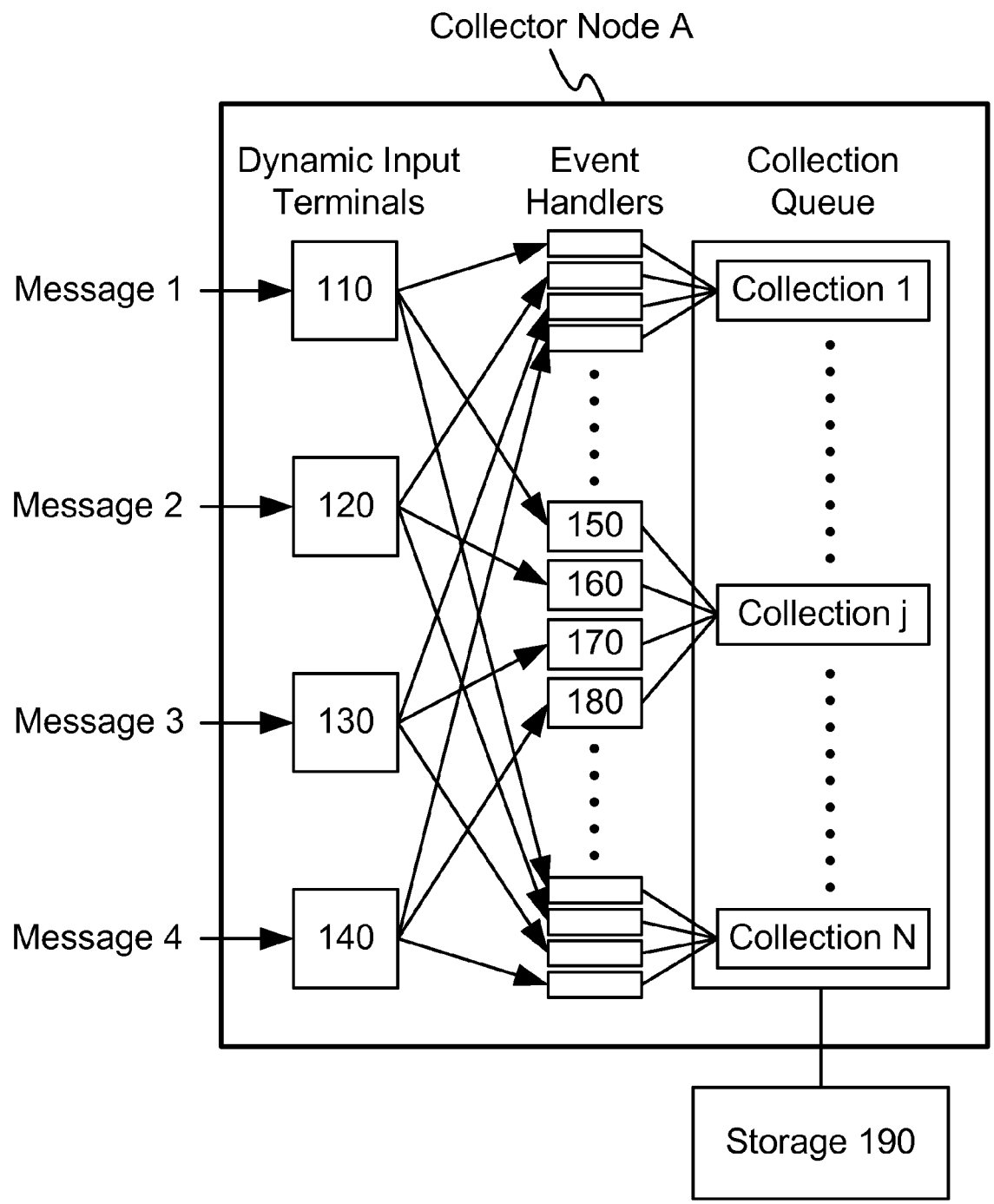
FIG. 1 illustrates the interaction of the incoming messages, a collector node, input terminals, and event handlers.
Figure 2:
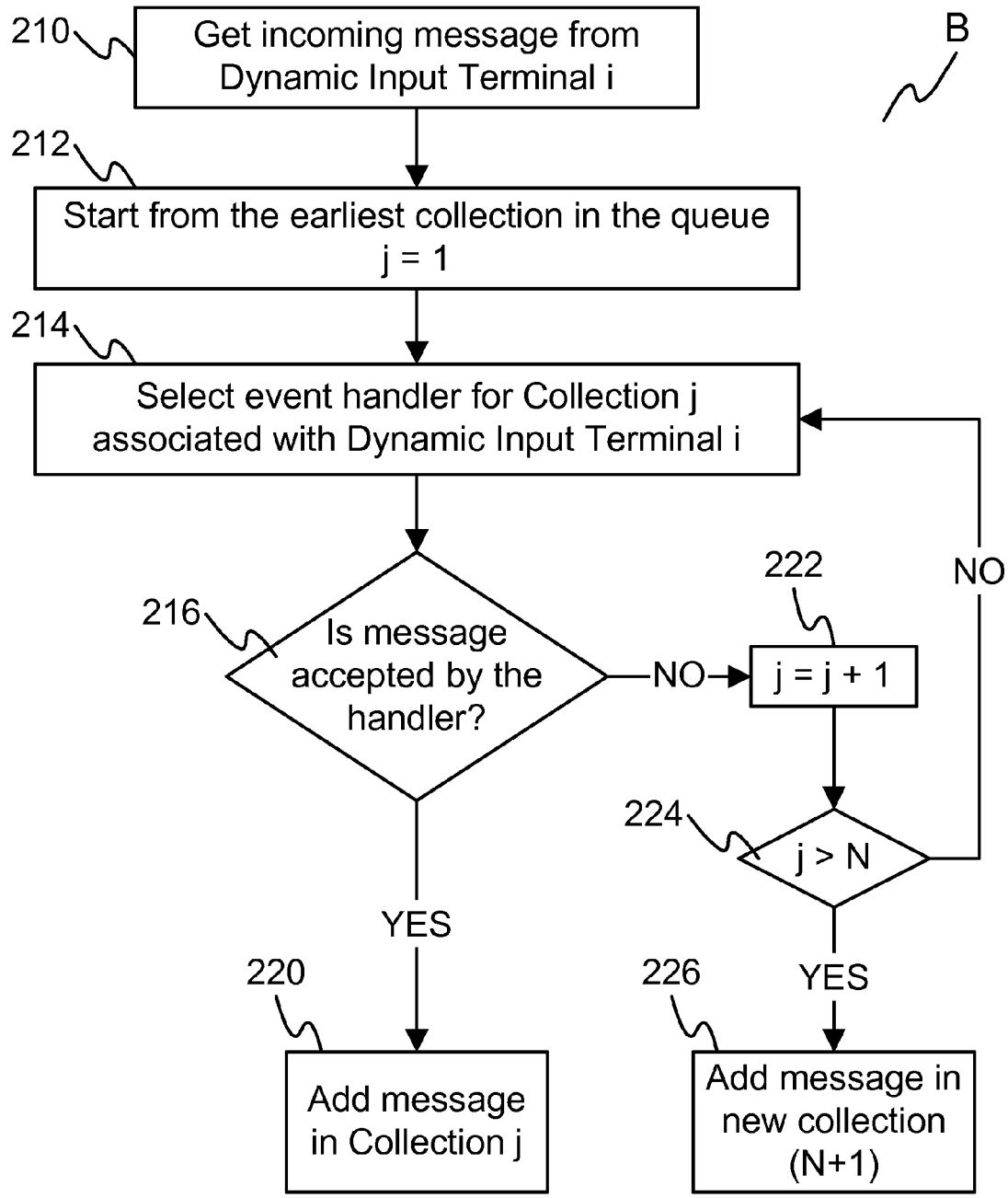
FIG. 2 shows a process flow diagram of the grouping tasks described in the present invention.

- Message Broker system for processing and routing messages in a distributed network
- Collector node (block A, FIG. 1) for collecting incoming messages into collections (groups) based on a user configurable criteria
- Collector node having dynamic input terminals (110-140), whose name and number are configurable by the user, where messages are received by the collector node (block A)
- Using a correlation path to determine the location of and to extract an extracted value from the content of incoming message, where the extracted value is located in the message content at the location addressed by the correlation path
- Determining a correlation string based on the extracted value and a correlation pattern (wild card)
- Collector node groups the messages into a collection based on their common correlation string (FIG. 2).
- Collector node holds the collections being built in a first in first out queue (FIFO).
- Each collection in the queue has a set of event handlers (150-180), one for each input terminal (110-140) receiving a message.
- As depicted in FIG. 2, the event handler either accepts an incoming message from the associated input terminal into the collection (220) or rejects the message. If the event handler accepts the message, the message becomes part of the collection (220), and other event handlers in the queue will not check the message. Nevertheless, if the event handler rejects the message, the next event handler (222) associated with the same input for the next collection in FIFO queue will check the message, and so on (the order is from the earliest collection in the queue to the latest collection). (210, 212, 214, 216)
- If the message is rejected by all event handlers, a new collection is added to the end of the queue to accept the message (226) and the new collection will be added to the list of current collections. (224)
- The order of messages in each collection is kept the same as the order of messages arrived at the collector node
- Collector node (A) has a persistent storage (190) for storing the messages accepted into a collection
- Determining whether a collection is ready for propagation (i.e. if it is complete) based on the user configurable criteria (mentioned above)
- The user configurable criteria comprises quantity threshold for the number of messages in a collection (if reached, the collection is deemed complete; the number could be infinite), event handler timeout threshold (if reached, the collection is deemed complete; this timeout could be infinite), collection expiry (maximum collection timeout when reached the collection is deemed expired—and no more messages may be added), correlation path, and correlation pattern Sending complete collections to Out terminal Sending expired collections to Expired terminal The correlation path is based on an XPath expression for messages with XML content The correlation string is a subset portion of the extracted value once taking out the correlation pattern Pausing the messages received from the input terminals mid flow to process them in collections WebSphere Message Broker has an add-on technology supporting Complex Event Processing (CEP) in the form of message processing nodes. The CEP nodes can be used to extract data from the messages, but it does not affect the original message, which still passes though the flow unaffected and hence have to be processed before related messages have been found.

However, in one embodiment, the current invention holds up messages until they have been formed into group. This allows the messages to be processed after the relevant collections have been made. The node is used to collect incoming messages into collections (groups) in accordance with user configurable criteria. A collection is "ready for propagation" when the collection is "complete" according to the configured parameters. In this case, the collection will be propagated to the "out" terminal. The collection expires according to a configurable timeout from when the first message in the collection arrived. In this case, the collection will be propagated to the "expired" terminal.

In this embodiment, the node has dynamic input terminals, whose number and names are configurable by the user. The node will hold a FIFO list (queue) of message collections that are currently being built (i.e. still incomplete). Each collection instance on the queue will have a set of event handlers, one for each input terminal. The role of the event handler is to determine whether an incoming message should be accepted as a member of a particular collection. Every event handler associated with a collection will signal that it is "satisfied" before that collection is considered complete. The event handler will store necessary state to support this behavior.

Incoming messages in the embodiment being described, will be offered to each collection in the queue in FIFO order. Either the event handler associated with the terminal that received the message will accept the message into the collection, in which case the message will not be offered to any other collections, OR it will reject the message, in which case the message will be offered to the next collection in the queue. If all collections in the queue reject the message, then a new collection will be added to the end of the queue, and the message will be accepted into that. The order of messages within each resultant tree structure of the message collection is the same as the order the messages arrived at the collector node. To achieve the required behavior set out in this embodiment of this disclosure, event handlers (150-180) have been defined with the following four configurable properties:

Quantity—This configures how many messages this event handler instance should accept (can be infinite if "Timeout" is finite).

Timeout—Determines the maximum time the event handler should accept messages for (can be infinite if "Quantity" is finite). If both Quantity and Timeout are finite, then the event handler will become satisfied when the first of these two conditions is met.

Correlation path—This allows messages to be grouped according to a value extracted from the content of the incoming messages. The path could be an XPath 1.0 expression that gets evaluated against the message and cast to a string by calling the XPath string( ) function.

Correlation pattern—If a correlation path is specified, the extracted value is matched against this pattern to extract the substring that matches a wildcard. For example, if the correlation path extracts the filename "part1.dat" in a file header, and the pattern is specified as "*.dat", then the correlation string is "part1". All event handlers across a collection will only accept messages that have the same correlation string. The first message in a collection will determine the correlation string that must be matched by all other messages in that collection. A pattern that fails to match the wildcard to a substring will use an empty string as its correlation string. This effectively groups unmatched messages into a default unnamed collection.

The collector node has one further property controlling the collection of messages:

Collection expiry—If configured, this will set a maximum timeout for a collection starting at the time the first message is accepted into the collection. This timer overrides any individual event handler timers. This is used to ensure incomplete collections do not remain and consume resources indefinitely. Once this timer expires, the incomplete collection is propagated to the "expired" output terminal.

Once the incoming message has been accepted into a collection, it is temporarily written into a persistent store managed by the collector node. When a collection is "ready for propagation," the messages it owns are extracted from this store, built into a single combined message, and propagated on to the next node in the flow.

With above descriptions, in the current embodiment, a method of grouping messages using message content is proposed. The method comprises the steps of processing a message in a distributed network, transforming the message, routing the message, and collecting the message into a first group at a collector node, based on user configurable criteria.

The collector node comprises dynamic input terminals, which receive the message. The name and number of the dynamic input terminals are configurable by the user. The collector, using a correlation path to determine a first location and to extract a first value from the content of the message, determines a first correlation string, based on the extracted first value and a correlation pattern and compares the first correlation string with a second correlation string, to find a common correlation string, by pausing the message received from the dynamic input terminals mid-flow, to process the message in collection.

The collector node groups the incoming messages into a collection, based on the common correlation string and holding the collection in a first-in-first-out queue. The collection in a first-in-first-out queue has a set of event handlers and each one in the set of event handlers corresponds to one of the dynamic input terminals.

The event handler either accepts the message or rejects the message. In case the event handler accepts the message, the message becomes a part of the collection. In case the event handler rejects the message, another event handler associated with the same dynamic input terminal for the next earliest collection in the first-in-first-out queue checks the message. In case the message is rejected by all of the event handlers, a new collection to the end of the first-in-first-out queue is added by the collector node, to accept the message.

Based on the user configurable criteria, the collector node further determines whether the collection is ready for propagation or not. The user configurable criteria comprises a quantity threshold for the number of messages in the collection, an event handler timeout threshold, a collection expiry for maximum collection timeout, a correlation path, and the correlation pattern sending completed collections to an out terminal, and sending expired collections to an expired terminal.

Any variations of the above teaching are also intended to be covered by this patent application.

A system, apparatus, or device comprising one of the following is an example for this invention: server, client machine, mail server, PC, mobile device, storage holding messages, router, switches, cables, fiber optics, communication devices, or antenna, sending the information, with the method mentioned above.

The invention claimed is:

1. A method of grouping messages using message content, said method comprising the steps of:
   processing a message in a distributed network;
   transforming said message;
   routing said message;
   collecting said message into a first group at a collector node, based on a user configurable criteria;
   wherein said collector node comprises dynamic input terminals;
   said dynamic input terminals receiving said message;
   wherein the name and number of said dynamic input terminals are configurable by said user;
   using a correlation path to determine a first location and to extract a first value from the content of said message;
   determining a first correlation string, based on said extracted first value and a correlation pattern;
   comparing said first correlation string with a second correlation string, to find a common correlation string;
   pausing said message received from said dynamic input terminals mid-flow, to process said message in collection;
   said collector node grouping incoming messages into a collection, based on said common correlation string;
   said collector node holding said collection in a first-in-first-out queue;
   wherein said collection in a first-in-first-out queue has a set of event handlers;
   wherein each of said set of event handlers corresponds to one of said dynamic input terminals;
   one of said set of event handlers either accepting said message or rejecting said message;
   in case said one of said set of event handlers accepts said message, said message becoming a part of said collection;
   in case said one of said set of event handlers rejects said message, another one of said set of event handlers associated with the same input for the next earliest collection in said first-in-first-out queue checking said message;
   in case said message is rejected by all of said set of event handlers, adding a new collection to the end of said first-in-first-out queue, to accept said message;
   determining whether said collection is ready for propagation, based on said user configurable criteria;
   wherein said user configurable criteria comprises:
   a quantity threshold for the number of messages in said collection;
   an event handler timeout threshold;
   a collection expiry for maximum collection timeout;
   a correlation path; and
   said correlation pattern;
   sending completed collections to an out terminal; and
   sending expired collections to an expired terminal.

* * * * *